(12) United States Patent
Chalmers et al.

(10) Patent No.: US 12,646,513 B2
(45) Date of Patent: Jun. 2, 2026

(54) COMMAND DISAMBIGUATION BASED ON ENVIRONMENTAL CONTEXT

(71) Applicant: Apple Inc., Cupertino, CA (US)

(72) Inventors: Devin W. Chalmers, Oakland, CA (US); Brian W. Temple, Santa Clara, CA (US); Carlo Eduardo C. Del Mundo, Bellevue, WA (US); Harry J. Saddler, Berkeley, CA (US); Jean-Charles Bernard Marcel Bazin, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 234 days.

(21) Appl. No.: 18/212,499

(22) Filed: Jun. 21, 2023

(65) Prior Publication Data

US 2024/0005921 A1 Jan. 4, 2024

Related U.S. Application Data

(60) Provisional application No. 63/356,626, filed on Jun. 29, 2022.

(51) Int. Cl.
*G10L 15/22* (2006.01)
*G06F 3/01* (2006.01)
*G06V 10/20* (2022.01)

(52) U.S. Cl.
CPC .............. *G10L 15/22* (2013.01); *G06F 3/013* (2013.01); *G06V 10/255* (2022.01); *G10L 2015/223* (2013.01)

(58) Field of Classification Search
CPC .............. G10L 15/22; G10L 2015/223; G10L 2015/226; G10L 2015/228; G06F 3/013; G06F 3/167; G06V 10/255; G06V 20/20; G06V 10/764
See application file for complete search history.

(56) References Cited

U.S. PATENT DOCUMENTS

| | | | |
|---|---|---|---|
| 9,116,962 B1 | 8/2015 | Pance | |
| 9,911,240 B2 | 3/2018 | Bedikian et al. | |
| 10,475,446 B2 | 11/2019 | Gruber et al. | |
| 10,565,256 B2 | 2/2020 | Badr et al. | |
| 10,963,735 B2 | 3/2021 | Rhoads | |
| 11,087,424 B1 | 8/2021 | Sarkar et al. | |
| 11,853,651 B2 * | 12/2023 | Francisco | G06F 3/167 |
| 2013/0238326 A1 * | 9/2013 | Kim | G10L 15/08 |
| | | | 704/E15.001 |
| 2018/0232608 A1 * | 8/2018 | Pradeep | H04N 21/44218 |

(Continued)

*Primary Examiner* — Abul K Azad
(74) *Attorney, Agent, or Firm* — Fernando & Partners, LLP

(57) ABSTRACT

In one implementation, a method of changing a state of an object is performed at a device including an image sensor, one or more processors, and non-transitory memory. The method includes receiving a vocal command. The method includes obtaining, using the image sensor, an image of a physical environment. The method includes detecting, in the image of the physical environment, an object based on a visual model of the object stored in the non-transitory memory in association with an object identifier of the object. The method includes generating, based on the vocal command and detection of the object, an instruction including the object identifier of the object. The method includes effectuating the instruction to change a state of the object.

21 Claims, 12 Drawing Sheets

(56) References Cited

U.S. PATENT DOCUMENTS

| | | | | |
|---|---|---|---|---|
| 2019/0333233 | A1* | 10/2019 | Hu | G01S 13/04 |
| 2020/0193206 | A1* | 6/2020 | Turkelson | H04N 25/00 |
| 2020/0193976 | A1* | 6/2020 | Cartwright | G06F 3/011 |
| 2020/0204391 | A1 | 6/2020 | Glaser et al. | |
| 2021/0342047 | A1 | 11/2021 | Badr et al. | |
| 2021/0366472 | A1 | 11/2021 | Lee et al. | |
| 2022/0012547 | A1 | 1/2022 | Zhu et al. | |
| 2023/0089049 | A1* | 3/2023 | Drummond | G06V 20/20 |
| | | | | 345/633 |
| 2024/0411364 | A1* | 12/2024 | Miller | G06V 10/25 |

* cited by examiner

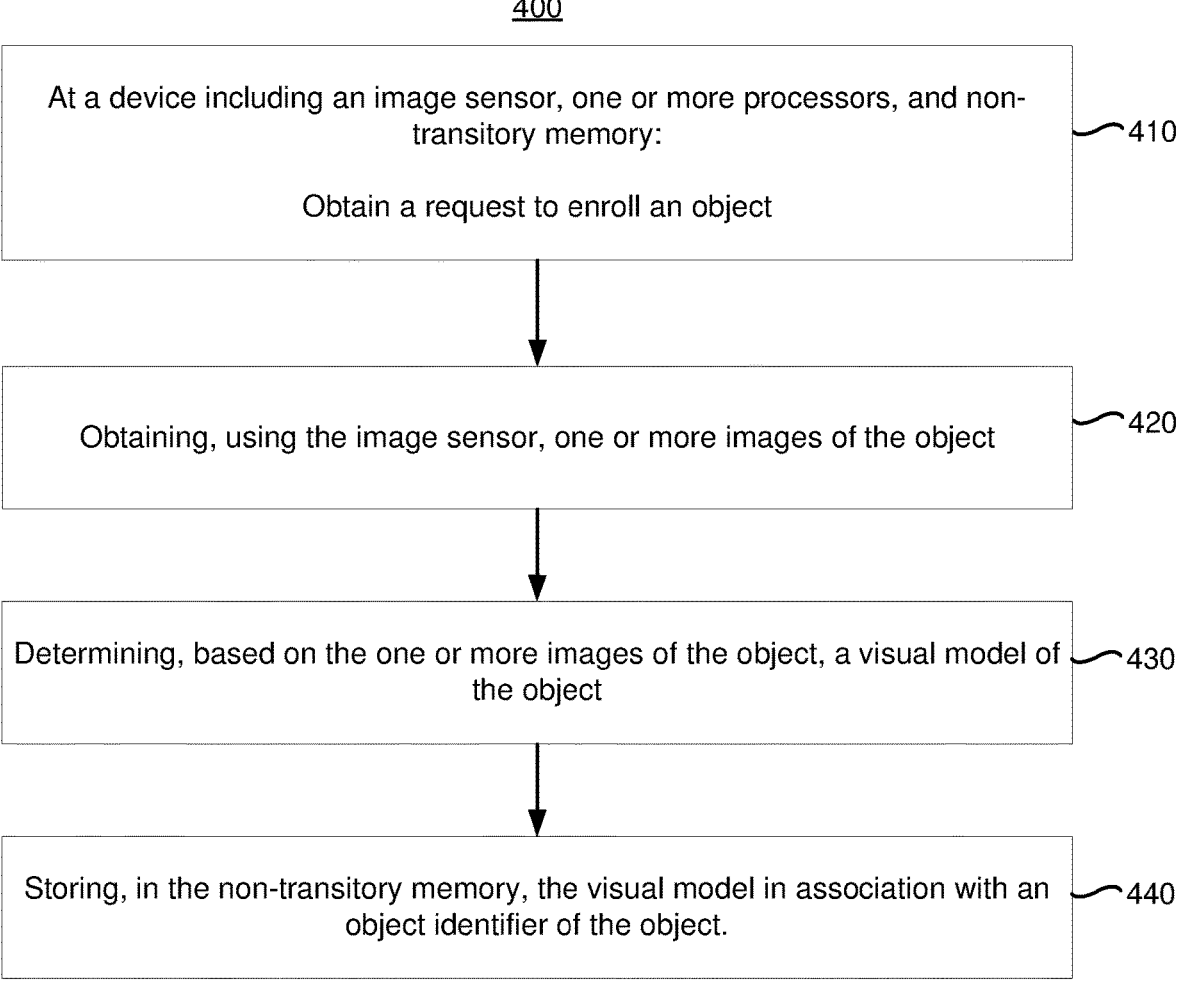

400

At a device including an image sensor, one or more processors, and non-transitory memory:

Obtain a request to enroll an object
— 410

Obtaining, using the image sensor, one or more images of the object
— 420

Determining, based on the one or more images of the object, a visual model of the object
— 430

Storing, in the non-transitory memory, the visual model in association with an object identifier of the object.
— 440

Figure 4

500

At a device including an image sensor, one or more processors, and non-transitory memory:

Receive a vocal command     ⌐510

Obtaining, using the image sensor, an image of the physical environment     ⌐520

Detecting, in the image of the physical environment, an object based on a visual model of the object stored in the non-transitory memory in association with an object identifier of the object     ⌐530

Generating, based on the vocal command and detection of the object, an instruction including the object identifier of the object     ⌐540

Effectuating the instruction to change a state of the object     ⌐550

Figure 5

COMMAND DISAMBIGUATION BASED ON ENVIRONMENTAL CONTEXT

CROSS-REFERENCE TO RELATED APPLICATIONS

This application claims priority to U.S. Provisional Patent App. No. 63/356,626, filed on Jun. 29, 2022, which is hereby incorporated by reference in its entirety.

TECHNICAL FIELD

The present disclosure generally relates to systems, methods, and devices for disambiguating vocal commands based on environmental context.

BACKGROUND

Smart agents receive vocal commands from a user and, based on the vocal commands, change the state of one or more smart devices. For example, in response to a vocal command to "Turn the thermostat to 70 degrees," a smart agent generates, and sends to a smart thermostat, an instruction to set a temperature to 70 degrees. As another example, in response to a vocal command to "Unlock the front door," a smart agent generates, and sends to a smart lock associated with a name of "front door", an instruction to unlock. However, in various implementations, a vocal command is ambiguous and may be interpreted by the smart agent in a number of ways. For example, a vocal command of "Turn off the light," may be interpreted as an instruction to turn off a first light associated with a location of "bedroom", turn off a second light associated with a location of "bathroom", or deactivate an indicator LED of a smart speaker. In order to improve the user experience, it is desirable to disambiguate between potential instructions without further user input.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 4 is a flowchart representation of a method of enrolling an object in a database in accordance with some implementations.

FIG. 5 is a flowchart representation of a method of changing a state of an object in accordance with some implementations.

Figure 1:
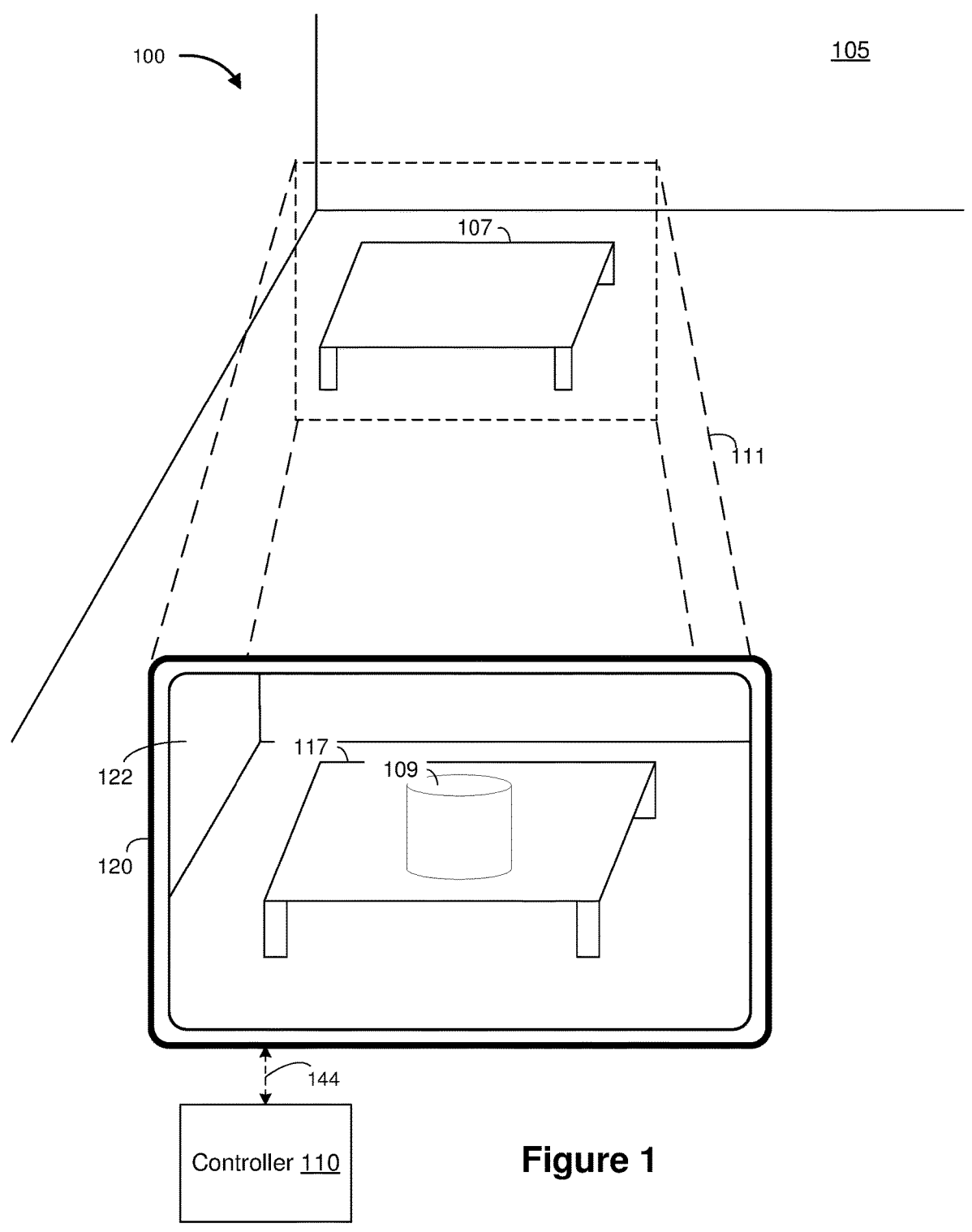
FIG. 1 is a block diagram of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for changing a state of an object. In various implementations, the method is performed by a device including an image sensor, one or more processors, and non-transitory memory. The method includes receiving a vocal command. The method includes obtaining, using the image sensor, an image of a physical environment. The method includes detecting, in the image of the physical environment, an object based on a visual model of the object stored in the non-transitory memory in association with an object identifier of the object. The method includes generating, based on the vocal command and detection of the object, an instruction including the object identifier of the object. The method includes effectuating the instruction to change a state of the object.

In accordance with some implementations, a device includes one or more processors, a non-transitory memory, and one or more programs; the one or more programs are stored in the non-transitory memory and configured to be executed by the one or more processors. The one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example implementations described herein.

As noted above, in various implementations, a vocal command issued to a smart agent may be interpreted in a number of ways. In various implementations, the smart agent requests clarification from a user to disambiguate between multiple interpretations. For example, in response to a vocal command to "Turn off the light," a smart agent may request that the user provide an answer to "Which light?" However, as described below, a smart agent may use environmental context to disambiguate between potential interpretations and generate an instruction without further user input. For example, in response to a vocal command to "Turn off the light," a smart agent may select a light that is "on" rather than one that is already "off", select a light that a user is looking at using an eye tracker, or select a notification LED that has recently been activated by a received notification. As another example, a smart agent may select a light that is in the same room at the user, e.g., a light that is detected in an image of the physical environment in which the user has issued the vocal command.

FIG. 1 is a block diagram of an example operating environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a controller 110 and an electronic device 120.

In some implementations, the controller 110 is configured to manage and coordinate an XR experience for the user. In some implementations, the controller 110 includes a suitable combination of software, firmware, and/or hardware. In some implementations, the controller 110 is a computing device that is local or remote relative to the physical environment 105. For example, the controller 110 is a local server located within the physical environment 105. In another example, the controller 110 is a remote server located outside of the physical environment 105 (e.g., a cloud server, central server, etc.). In some implementations, the controller 110 is communicatively coupled with the electronic device 120 via one or more wired or wireless communication channels 144 (e.g., BLUETOOTH, IEEE 802.11x, IEEE 802.16x, IEEE 802.3x, etc.). In another example, the controller 110 is included within the enclosure of the electronic device 120. In some implementations, the functionalities of the controller 110 are provided by and/or combined with the electronic device 120.

In some implementations, the electronic device 120 is configured to provide the XR experience to the user. In some implementations, the electronic device 120 includes a suitable combination of software, firmware, and/or hardware. According to some implementations, the electronic device 120 presents, via a display 122, XR content to the user while the user is physically present within the physical environment 105 that includes a table 107 within the field-of-view 111 of the electronic device 120. As such, in some implementations, the user holds the electronic device 120 in his/her hand(s). In some implementations, while providing XR content, the electronic device 120 is configured to display an XR object (e.g., an XR cylinder 109) and to enable optical see-through or video pass-through of the physical environment 105 (e.g., including a representation 117 of the table 107) on a display 122.

According to some implementations, the electronic device 120 provides an XR experience to the user while the user is virtually and/or physically present within the physical environment 105.

In some implementations, the user wears the electronic device 120 on his/her head. For example, in some implementations, the electronic device includes a head-mounted system (HMS), head-mounted device (HMD), or head-mounted enclosure (HME). As such, the electronic device 120 includes one or more XR displays provided to display the XR content. For example, in various implementations, the electronic device 120 encloses the field-of-view of the user. In some implementations, the electronic device 120 is a handheld device (such as a smartphone or tablet) configured to present XR content, and rather than wearing the electronic device 120, the user holds the device with a display directed towards the field-of-view of the user and a camera directed towards the physical environment 105. In some implementations, the handheld device can be placed within an enclosure that can be worn on the head of the user. In some implementations, the electronic device 120 is replaced with an XR chamber, enclosure, or room configured to present XR content in which the user does not wear or hold the electronic device 120.

FIGS. 2A-2G illustrate a first XR environment 200 displayed, at least in part, by a display of the electronic device. The first XR environment 200 is based on a physical environment of an office in which the electronic device is present. FIGS. 2A-2G illustrate the first XR environment 200 during a series of time periods. In various implementations, each time period is an instant, a fraction of a second, a few seconds, a few hours, a few days, or any length of time.

The first XR environment 200 includes a plurality of objects, including one or more physical objects (e.g., a desk 211, a desk lamp 212, an overhead lamp 213, and a smartphone 230) of the physical environment and one or more virtual objects (e.g., a virtual flower arrangement 221 and a virtual clock 222). In various implementations, certain objects (such as the physical objects 211-213 and 230 and the virtual flower arrangement 221) are displayed at a location in the first XR environment 200, e.g., at a location defined by three coordinates in a three-dimensional (3D) XR coordinate system. Accordingly, when the electronic device moves in the first XR environment 200 (e.g., changes either position and/or orientation), the objects are moved on the display of the electronic device, but retain their location in the first XR environment 200. Such virtual objects that, in response to motion of the electronic device, move on the display, but retain their position in the first XR environment are referred to as world-locked objects. In various implementations, certain virtual objects (such as the virtual clock 222) are displayed at locations on the display such that when the electronic device moves in the first XR environment 200, the objects are stationary on the display on the electronic device. Such virtual objects that, in response to motion of the electronic device, retain their location on the display are referred to as head-locked objects or display-locked objects.

Figure 2A:
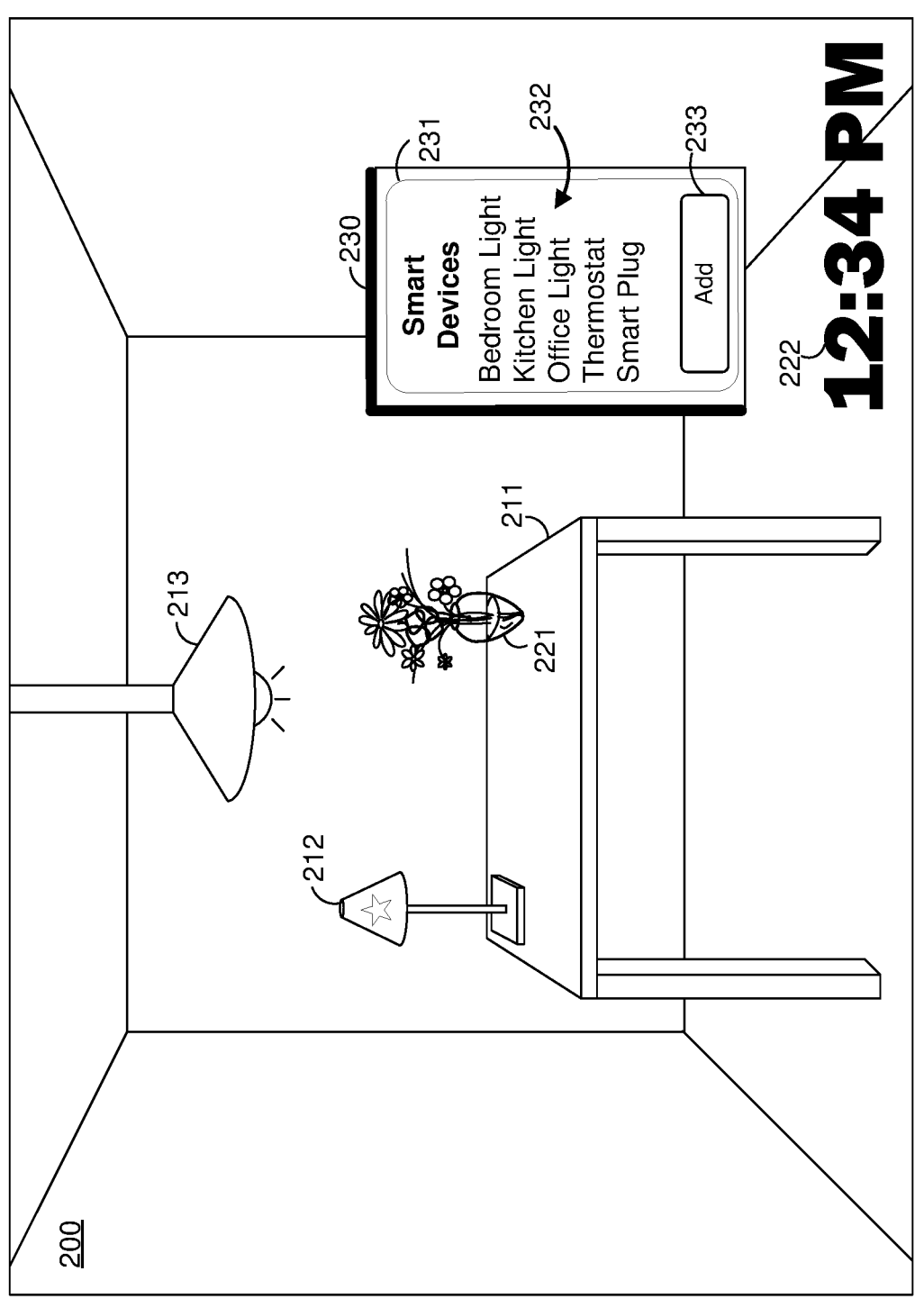
FIGS. 2A-2G illustrate a first XR environment during various time periods in accordance with some implementations.

FIG. 2A illustrates the first XR environment 200 during a first time period. During the first time period, the smartphone 230 displays, on a display, a smart agent user interface 231 including a list of paired smart devices 232 paired with a smart agent and an add affordance 233 for pairing an additional smart device with the smart agent. Although FIGS. 2A-2E illustrate the smart agent user interface as being displayed by a physical object (e.g., the smartphone 230), in various implementations, the smart agent user interface is displayed by a virtual object, such as a virtual screen, virtual window, or virtual tile.

The list of paired smart devices 232 includes a first device associated with a name of "Bedroom Light", a second device associated with a name of "Kitchen Light", a third device (namely, the overhead lamp 213 or a light bulb thereof) associated with a name of "Office Light", a fourth device associated with a name of "Thermostat", and a fifth device associated with a name of "Smart Plug". Each of the paired smart devices is associated with a name (as shown in the list of paired smart devices 232) and an object identifier. In various implementations, the object identifier is network address, such as a MAC address, an IP address, or a Bluetooth address. Thus, as an example, the overhead lamp 213 (e.g., the third device) is a physical object represented by the smart agent as a data structure with a name (e.g., "Office Light), an object identifier (e.g., a network address), and, in various implementations, additional metadata, such as a location (e.g., "Office"), an object type (e.g., "light"), or a list of states of the physical object that can be changed (e.g., "on", "brightness", and "color").

Figure 2B:
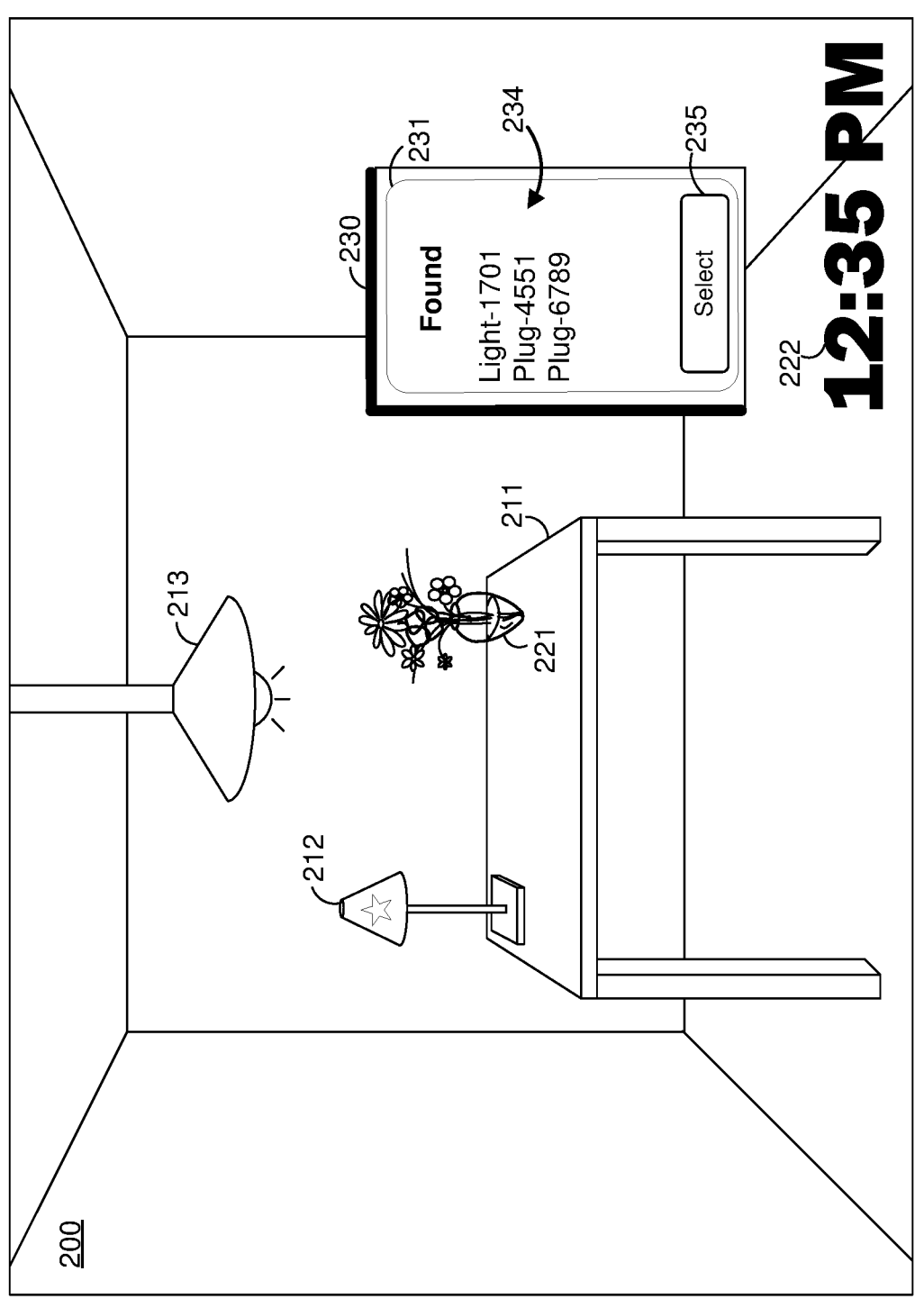

FIG. 2B illustrates the first XR environment 200 during a second time period subsequent to the first time period. Between the first time period and the second time period, a user has interacted with the smartphone 230 to select the add affordance 233. Based on this user input, the smart agent user interface 231 includes a list of available smart devices 234 detected by the smart agent that can be paired with the smart agent and a select affordance 235 for selecting an object represented by the list of available smart devices 234. Each of the available smart devices is associated with an object identifier.

The list of available smart devices 234 includes a sixth device (namely, the desk lamp 212 or a light bulb thereof) associated with a temporary name of "Light-1701" based on a device type and an object identifier of the sixth device, a seventh device associated with a temporary name of "Plug-4551" based on a device type and an object identifier of the seventh device, and an eighth device associated with a temporary name of "Plug-6789" based on a device type and an object identifier of the eighth device.

Figure 2C:
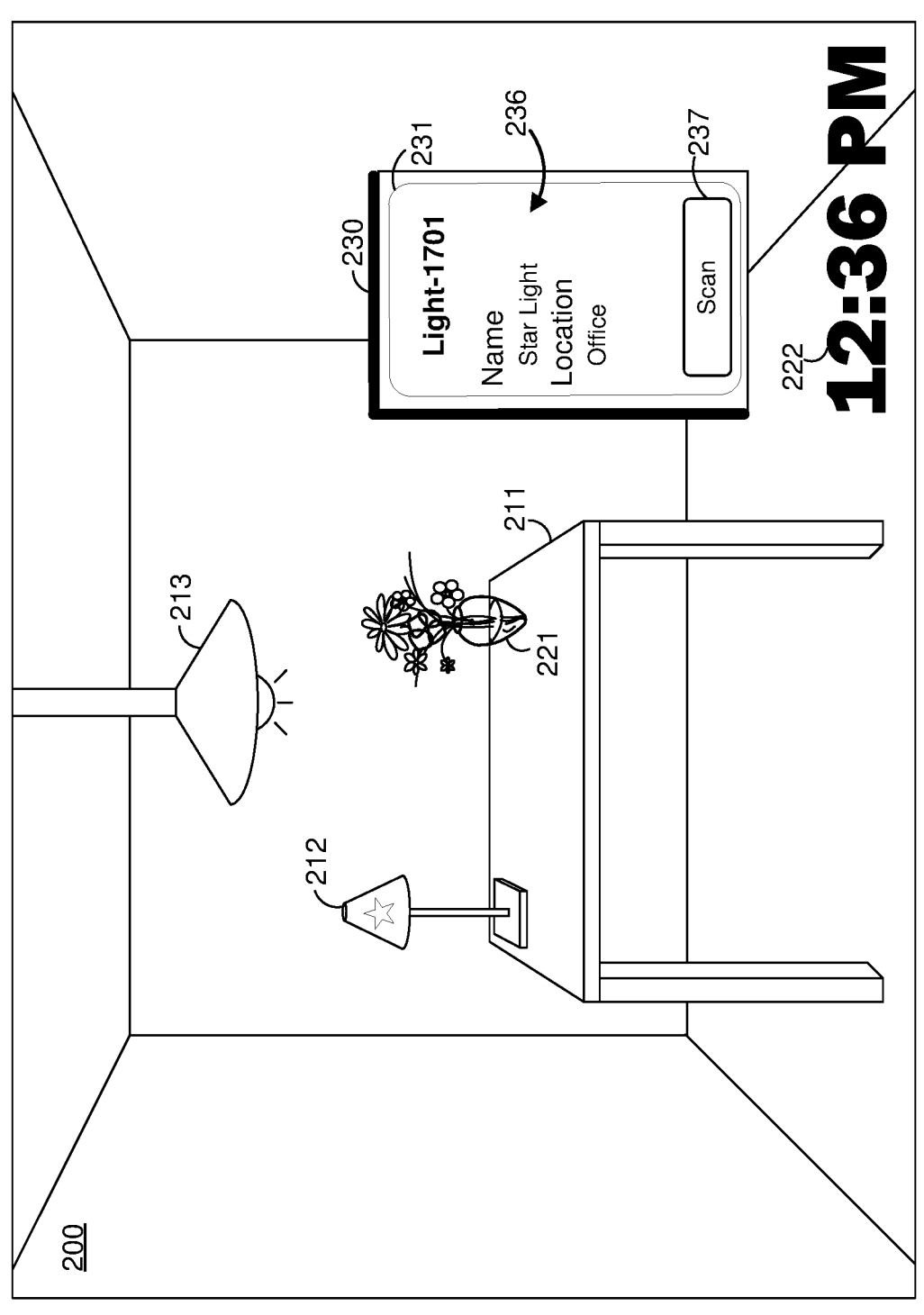

FIG. 2C illustrates the first XR environment 200 during a third time period subsequent to the second time period. Between the second time period and the third time period, the user has interacted with the smartphone 230 to select the sixth device from the list of available smart devices 234 and further interacted with the smartphone 230 to select the select affordance 235. Based on this user input, the smart agent user interface 231 includes a settings panel 236 allowing a user to set a name and location for the sixth device and a scan affordance 237. In FIG. 4C, the user has set the name associated with the sixth device as "Star Light" and set the location associated with the sixth device as "Office". Thus, the desk lamp 212 (e.g., the sixth device) is a physical object represented by the smart agent as a data structure with a name (e.g., "Star Light), an object identifier (e.g., a network address), and, in various implementations, additional metadata, such as a location (e.g., "Office"), an object type (e.g., "light"), or a list of states of the physical object that can be changed (e.g., "on", "brightness", and "color").

Figure 2D:
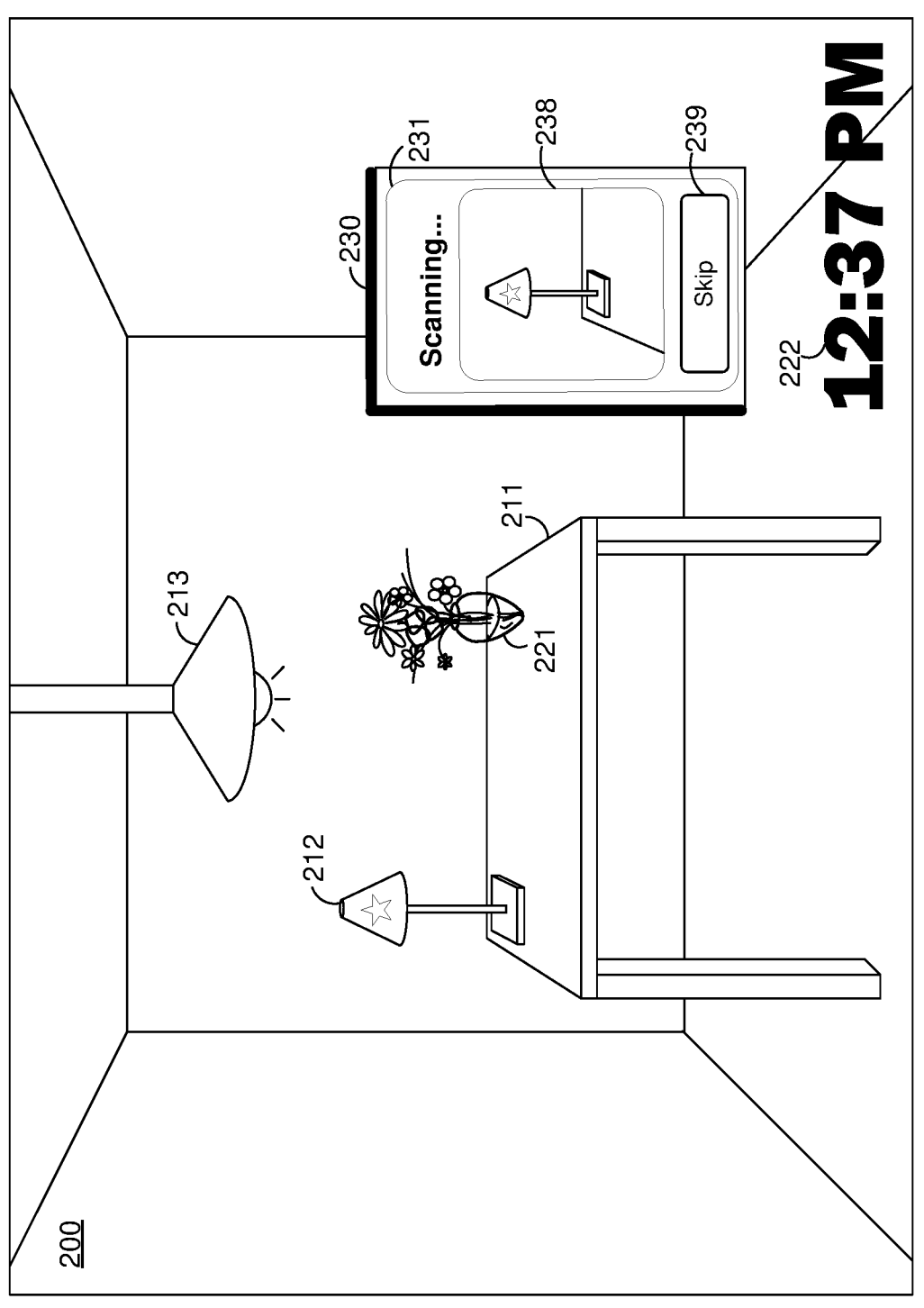

FIG. 2D illustrates the first XR environment 200 during a fourth time period subsequent to the third time period. Between the third time period and the fourth time period, the user has interacted with the smartphone 230 to select the scan affordance 237. Based on this user input, the smart agent user interface 231 includes a viewfinder window 238 and a skip affordance 239. The smart agent obtains, e.g., from an image sensor of the 120 smartphone 230, images of the sixth device (e.g., the desk lamp 212) and generates a visual model of the sixth device. In various implementations, the visual model is a three-dimensional object model. In various implementations, the visual model is a neural network trained to detect the sixth device in images of a physical environment.

Figure 2E:
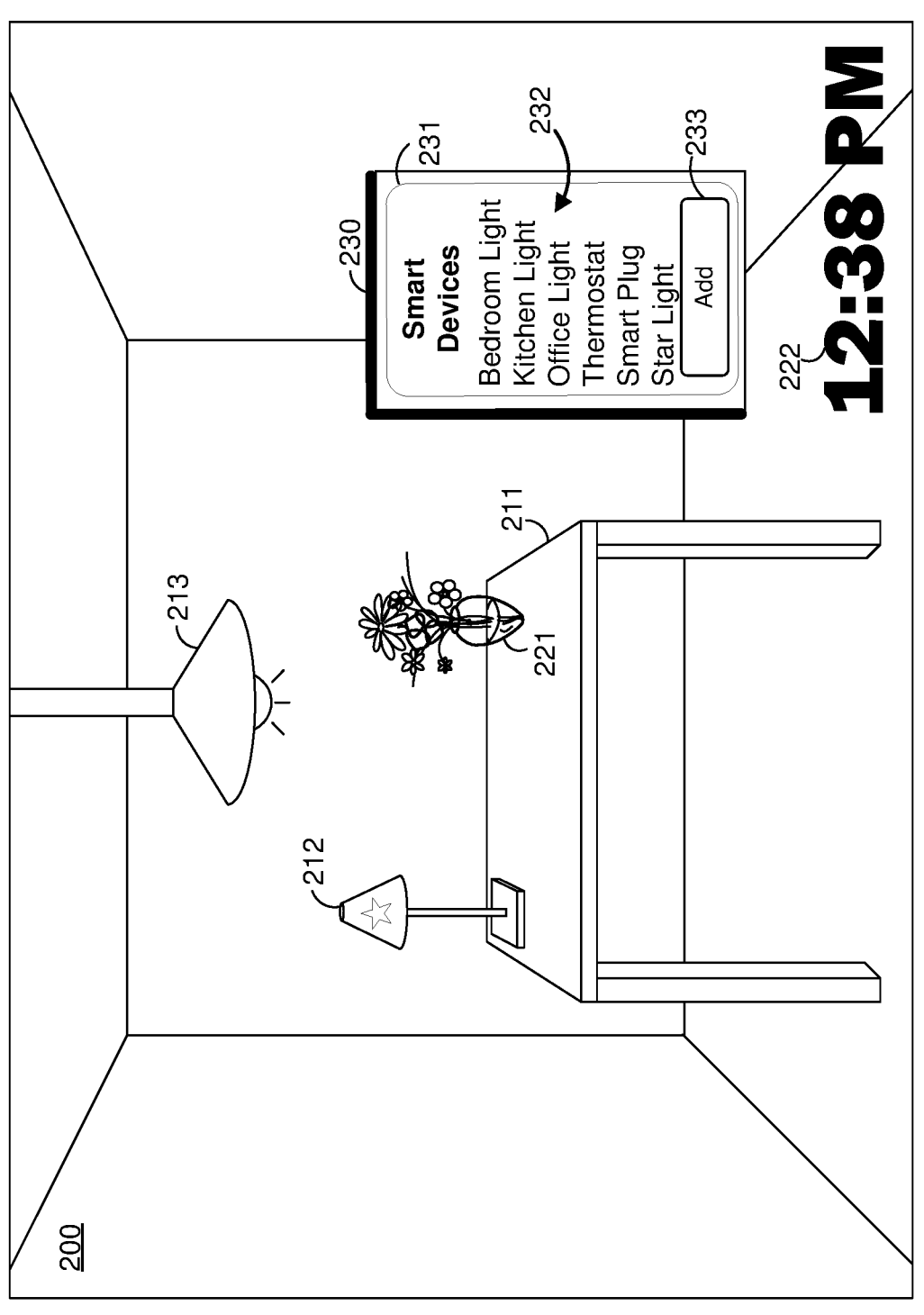

FIG. 2E illustrates the first XR environment 200 during a fifth time period subsequent to the fourth time period. Once the visual model is generated, the smart agent stores the visual model in association with the sixth device, e.g., in the data structure including the name and object identifier of the sixth device and the smart agent user interface 231 displays the list of paired smart devices 232 including the sixth device. If the smart agent fails to generate a visual model, or the user selects the skip affordance 239, the smart agent user interface 231 displays the list of paired smart devices 232 including the sixth device, but does not store a visual model in the data structure.

Figure 2F:
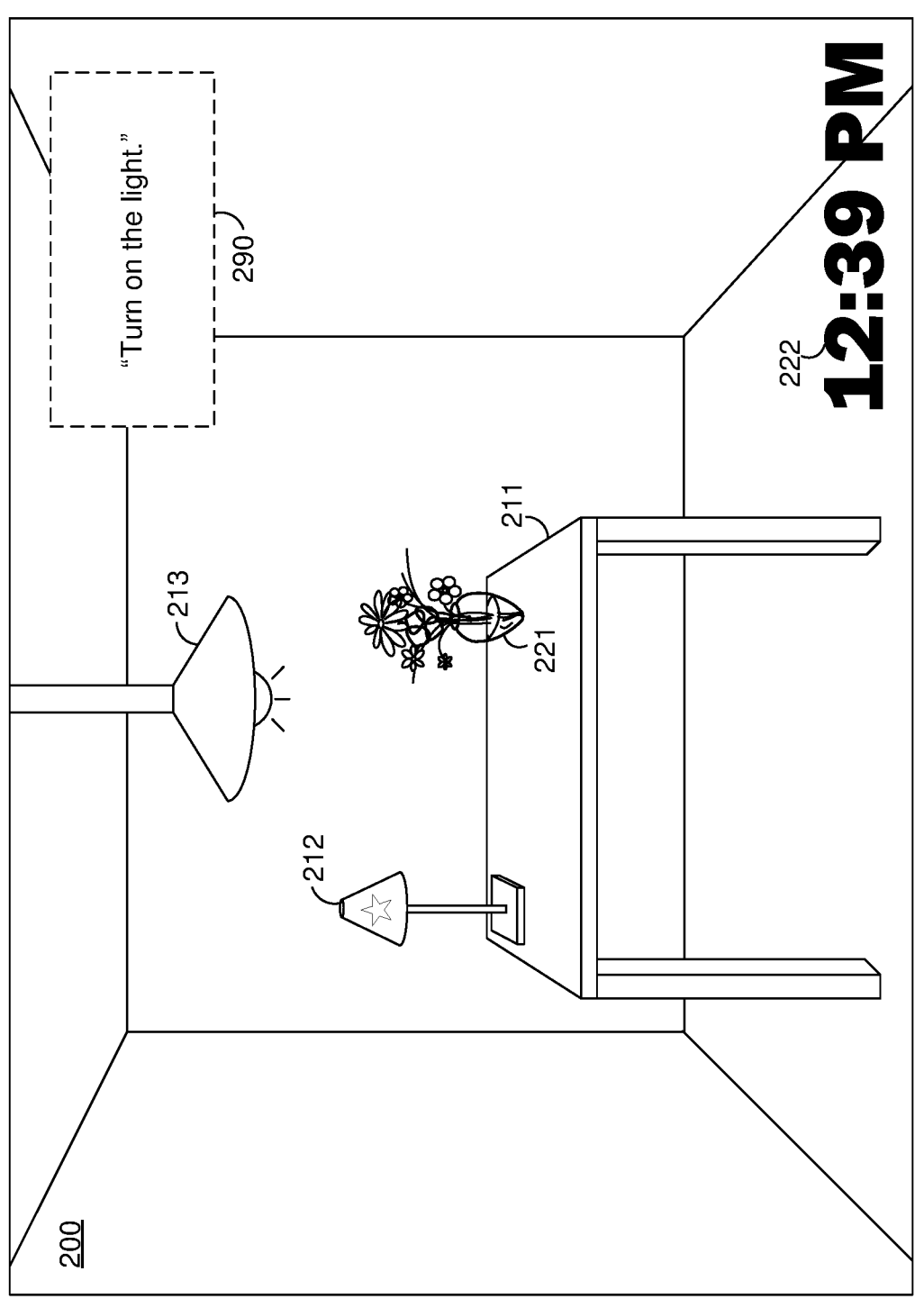

FIG. 2F illustrates the first XR environment 200 during a sixth time period subsequent to the fifth time period. During the sixth time period, the first XR environment 200 includes a command indicator 290. The command indicator 290 is a display-locked virtual object displayed by the electronic device in response to a vocal command from the user. For example, during the sixth time period, the user has vocally commanded "Turn on the light." Although FIG. 2F illustrates the command indicator 290 as a display-locked virtual object, in various implementations, the command indicator 290 is not displayed.

In various implementations, the smart agent can interpret the vocal command to "Turn on the light" as a first potential instruction to turn on the first device named "Bedroom Light", a second potential instruction to turn on the second device named "Kitchen Light", a third potential instruction to turn on the third device (e.g., the overhead lamp 213) named "Office Light", or a fourth potential instruction to turn on the sixth device (e.g., the desk lamp 212) named "Star Light". Based on detecting the desk lamp 212 and the overhead lamp 213 in the first XR environment 200 (e.g., in an image of the physical environment of the office on which the first XR environment 200 is based) at or proximate to the time the vocal command was issued, the smart agent narrows the potential instructions to the third potential instruction to turn on the overhead lamp 213 and the fourth potential instruction to turn on the desk lamp 212. Based on determining that the overhead lamp 213 is already on (and the desk lamp 212 is off), the smart agent selects the fourth potential instruction to turn on the desk lamp 212. Accordingly, the smart agent generates a data packet addressed to the desk lamp 212 using the object identifier of the desk lamp 212 stored in the data structure representing the desk lamp 212 and including an instruction to set the "on" state of the recipient to "true", e.g., to turn on. Further, the smart agent sends the data packet using an appropriate protocol, such as IP (e.g., HTTP) or Bluetooth, and the data packet is received by the addressed device, e.g., the desk lamp 212.

Figure 2G:
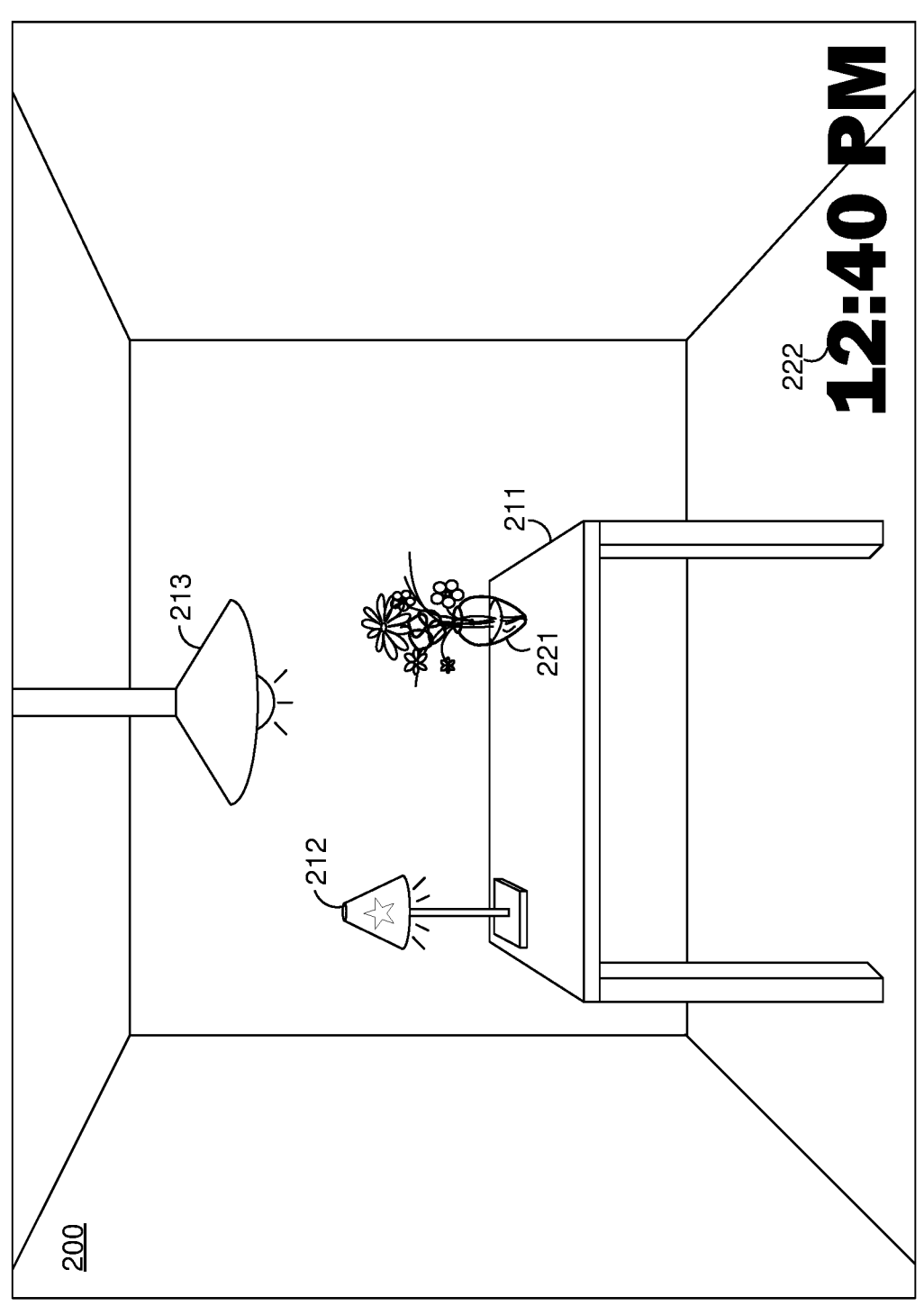

FIG. 2G illustrates the first XR environment 200 during a seventh time period subsequent to the sixth time period. In response to receiving the instruction to turn on, the desk lamp 212 turns on. Accordingly, during the seventh time period, the desk lamp 212 is on.

Figure 3A:
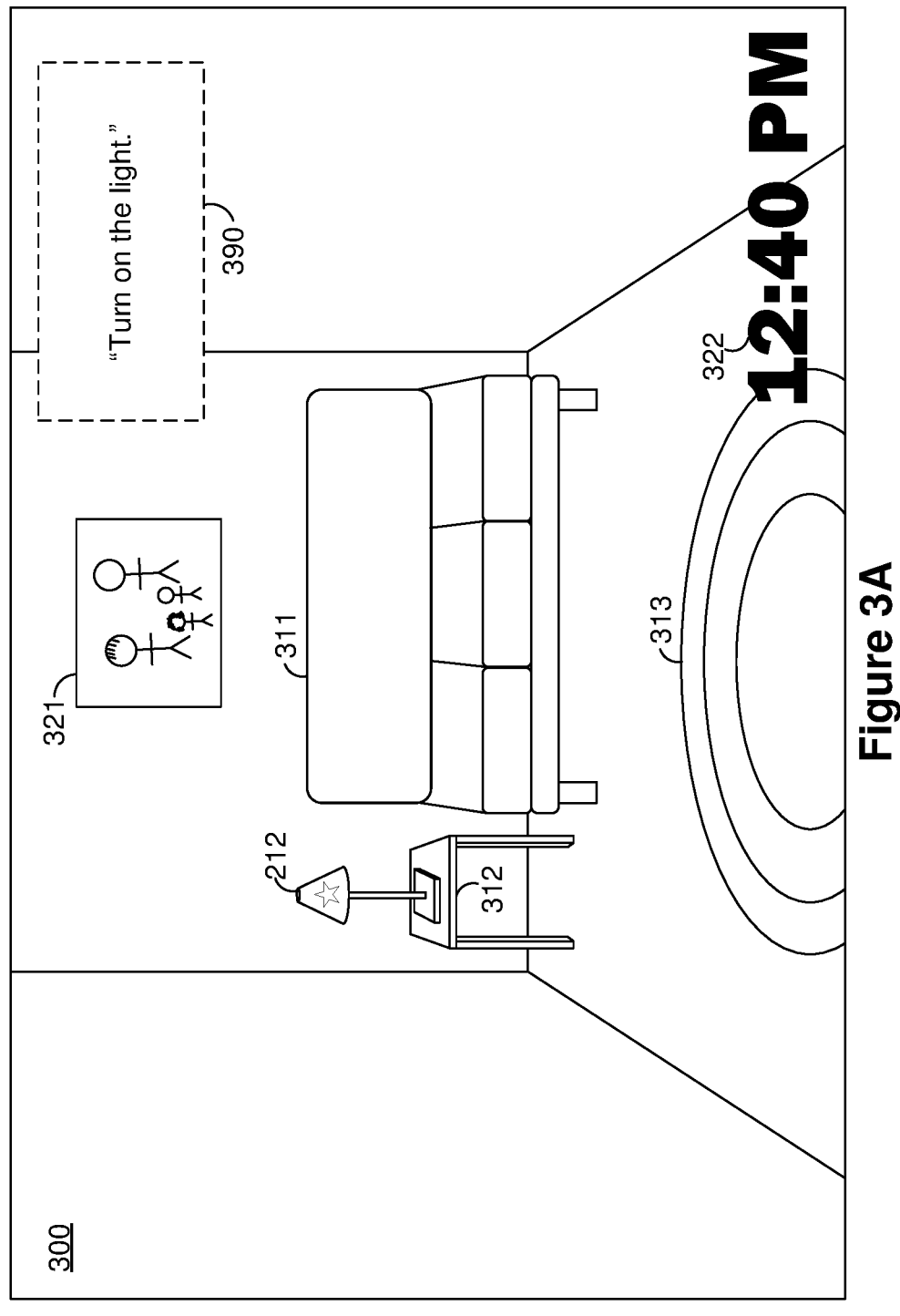
FIGS. 3A-3B illustrate a second XR environment during various time periods in accordance with some implementations.
Figure 3B:
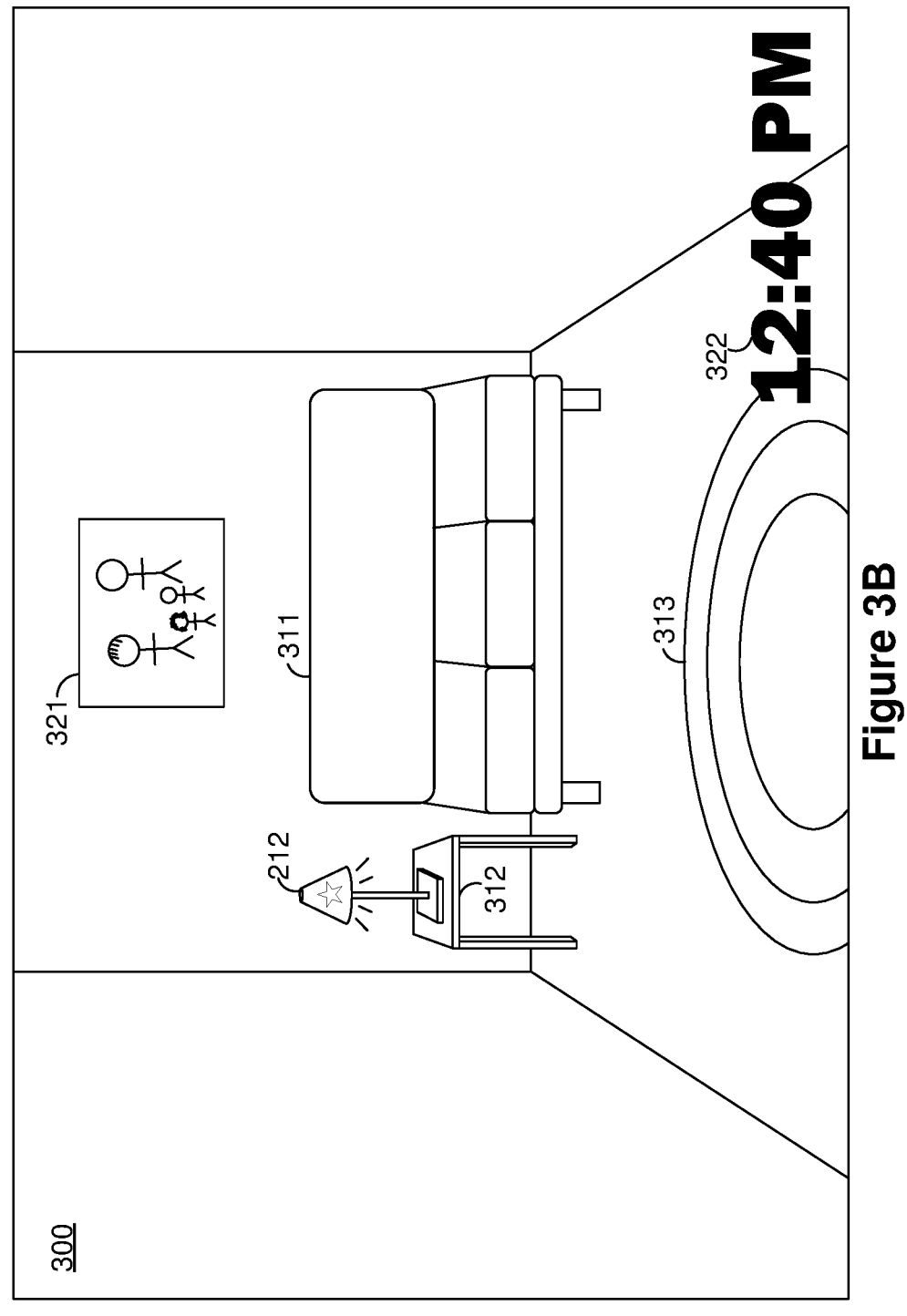

FIGS. 3A-3B illustrate a second XR environment 300 displayed, at least in part, by a display of the electronic device. The second XR environment 300 is based on a physical environment of a living room in which the electronic device is present. FIGS. 3A-3B illustrate the second XR environment 300 during a series of time periods. In various implementations, each time period is an instant, a fraction of a second, a few seconds, a few hours, a few days, or any length of time.

The second XR environment 300 includes a plurality of objects, including one or more physical objects (e.g., a sofa 311, the desk lamp 212, a side table 312, and a rug 313) of the physical environment and one or more virtual objects (e.g., a virtual picture 321 and a virtual clock 322). In various implementations, certain objects (such as the physical objects 212 and 311-313 and the virtual picture 321) are displayed at a location in the second XR environment 300, e.g., at a location defined by three coordinates in a three-dimensional (3D) XR coordinate system. Accordingly, when the electronic device moves in the second XR environment 300 (e.g., changes either position and/or orientation), the objects are moved on the display of the electronic device, but retain their location in the second XR environment 300. Such virtual objects that, in response to motion of the electronic device, move on the display, but retain their position in the second XR environment are referred to as world-locked objects. In various implementations, certain virtual objects (such as the virtual clock 322) are displayed at locations on the display such that when the electronic device moves in the second XR environment 300, the objects are stationary on the display on the electronic device. Such virtual objects that, in response to motion of the electronic device, retain their location on the display are referred to as head-locked objects or display-locked objects.

FIG. 3A illustrates the second XR environment 300 during a first time period. During the first time period, the desk lamp 212 has been moved from desk 211 of the first XR environment 200 of FIGS. 2A-2G to the side table 312 of the second XR environment 300. During the first time period, the second XR environment 300 includes a command indicator 390. The command indicator 390 is a display-locked virtual object displayed by the electronic device in response to a vocal command from the user. For example, during the first time period, the user has vocally commanded "Turn on the light." Although FIG. 3A illustrates the command indicator 390 as a display-locked virtual object, in various implementations, the command indicator 390 is not displayed.

As noted above, in various implementations, the smart agent can interpret the vocal command to "Turn on the light" as a first potential instruction to turn on the first device named "Bedroom Light", a second potential instruction to turn on the second device named "Kitchen Light", a third potential instruction to turn on the third device (e.g., the overhead lamp 213) named "Office Light", or a fourth potential instruction to turn on the sixth device (e.g., the desk lamp 212) named "Star Light". Based on detecting the desk lamp 212 in the second XR environment 300 (e.g., in an image of the physical environment of the living room on which the second XR environment 300 is based) at or proximate to the time the vocal command was issued, the smart agent selects the fourth potential instruction to turn on the desk lamp 212. Accordingly, the smart agent generates a data packet addressed to the desk lamp 212 using the object identifier of the desk lamp 212 stored in the data structure representing the desk lamp 212 and including an instruction to set the "on" state of the recipient to "true", e.g., to turn on. Further, the smart agent sends the data packet using an appropriate protocol, such as IP (e.g., HTTP) or Bluetooth, and the data packet is received by the addressed device, e.g., the desk lamp 212.

FIG. 3B illustrates the second XR environment 300 during a second time period subsequent to the first time period. In response to receiving the instruction to turn on, the desk lamp 212 turns on. Accordingly, during the second time period, the desk lamp 212 is on.

FIG. 4 is a flowchart representation of a method 400 of enrolling an object in a database in accordance with some implementations. In various implementations, the method 400 is performed by a device including an image sensor, one or more processors, and non-transitory memory (e.g., the electronic device 120 of FIG. 1). In some implementations, the method 400 is performed by processing logic, including hardware, firmware, software, or a combination thereof. In some implementations, the method 400 is performed by a processor executing instructions (e.g., code) stored in a non-transitory computer-readable medium (e.g., a memory).

The method 400 begins, in block 410, with the device obtaining a request to enroll an object. For example, in FIG. 2A, the smartphone 230 receives user input selecting the add affordance and, in FIG. 2B, the smartphone 230 receives user input selecting the desk lamp 212 from the list of available smart devices 234 and the select affordance 235. In various implementations, the object is a pairable smart device. In various implementations, the request to enroll the object includes selection of the object from a list of available objects.

The method 400 continues, in block 420, with the device obtaining, using the image sensor, one or more images of the object. For example, in FIG. 2D, the smartphone 230 captures images of the desk lamp 212. In various implementations, the one or more images of the object includes a plurality of images of the object from a plurality of different perspectives. In various implementations, the one or more images of the object include depth information.

The method 400 continues, in block 430, with the device determining, based on the one or more images of the object, a visual model of the object. In various implementations, the visual model of the object is a three-dimensional model of the object. In various implementations, the visual model of the object is a neural network trained on the images of the object to detect the object in other images of the object.

The method 400 continues, in block 440, with the device storing, in the non-transitory memory, the visual model in association with an object identifier of the object. In various implementations, the object identifier is a network address, such as an IP address, MAC address, or Bluetooth address. In various implementations, the object identifier is a UUID or global UID. In various implementations, the object identifier is intrinsically associated with the object. In various implementations, the object identifier is automatically assigned, e.g., not assigned by a user. In various implementations, the object identifier is determined before obtaining the request to enroll the object in block 410.

In various implementations, the visual model is stored in association with the object identifier in an object data structure including data regarding the object. In various implementations, the data structure includes additional information regarding the object, such as a user-provided name of the object or a location of the object (e.g., a room in which the object is located).

FIG. 5 is a flowchart representation of a method 500 of changing a state of an object in accordance with some implementations. In various implementations, the method 500 is performed by a device including an image sensor, one or more processors, and non-transitory memory (e.g., the electronic device 120 of FIG. 1). In some implementations, the method 500 is performed by processing logic, including hardware, firmware, software, or a combination thereof. In some implementations, the method 500 is performed by a processor executing instructions (e.g., code) stored in a non-transitory computer-readable medium (e.g., a memory).

The method 500 begins, in block 510, with the device receiving a vocal command. For example, in FIG. 2F, the smart agent receives the vocal command to "Turn on the light." As another example in FIG. 3A, the smart agent receives the vocal command to "Turn on the light."

The method 500 continues, in block 520, with the device obtaining, using the image sensor, an image of the physical environment. The method 500 continues, in block 530, with the device detecting, in the image of the physical environment, an object based on the visual model of the object stored in the non-transitory memory in association with an object identifier of the object. For example, in FIG. 2F, the smart agent detects the desk lamp 212 and the overhead lamp 213 in an image of the first XR environment 200. As another example, in FIG. 3A, the smart agent detects the desk lamp 212 in an image of the second XR environment 300.

In various implementations, the object identifier is a network address, such as an IP address, MAC address, or Bluetooth address. In various implementations, the object identifier is a UUID or global UID. In various implementations, the object identifier is intrinsically associated with the object. In various implementations, the object identifier is automatically assigned, e.g., not assigned by a user.

In various implementations, the visual model is stored in association with the object identifier in an object data structure including data regarding the object. In various implementations, the data structure includes additional information regarding the object, such as an object type of the object, a name of the object (e.g., a user-provided name), or a location of the object (e.g., a room in which the object is located).

In various implementations, the method 400 of FIG. 4 is used to store the object in the non-transitory memory in association with the object identifier of the object. Accordingly, in various implementations, the method 500 further includes obtaining a request to enroll the object; obtaining, using the image sensor, one or more images of the object; determining, based on the one or more images of the object, a visual model of the object; and storing, in the non-transitory memory, the visual model in association with the object identifier of the object.

The method 500 continues, in block 540, with the device generating, based on the vocal command and detection of the object, an instruction including the object identifier of the object. In various implementations, generating the instruction includes generating, based on the vocal command, a plurality of potential instructions and selecting, based on the detection of the object, one of the plurality of potential instructions as the instruction. For example, in FIG. 3A, the smart agent can interpret the vocal command to "Turn on the light" as a first potential instruction to turn on the first device named "Bedroom Light", a second potential instruction to turn on the second device named "Kitchen Light", a third potential instruction to turn on the third device (e.g., the overhead lamp 213) named "Office Light", or a fourth potential instruction to turn on the sixth device (e.g., the desk lamp 212) named "Star Light". Based on detecting the desk lamp 212 in the second XR environment 300 (e.g., in an image of the physical environment of the living room on which the second XR environment 300 is based) at or proximate to the time the vocal command was issued, the smart agent selects the fourth potential instruction to turn on the desk lamp 212. Accordingly, the smart agent generates a data packet addressed to the desk lamp 212 using the object identifier of the desk lamp 212 stored in the data structure representing the desk lamp 212 and including an instruction to set the "on" state of the recipient to "true", e.g., to turn on.

In various implementations, generating the instruction is further based on additional information. This additional information may be used in generating the plurality of potential instructions or selecting one of the plurality of instructions.

In various implementations, the object identifier of the object is further stored in association with an object type of the object. In various implementations, generating the instruction is based on the object type of the object. For example, in response to a vocal command to "Unlock," the plurality of instructions may be generated for a plurality of smart locks, e.g., smart devices with an object type of "lock". For example, the smart agent can generate a first potential instruction to unlock a first device named "Front Door" installed in a front door and a second potential instruction to unlock a second device named "Garage Door" installed in a garage door connecting a garage to the interior of a home. Based on detecting the garage door in an image of the physical environment at or proximate to the time the vocal command was issued, the smart agent selects the second potential instruction to unlock the garage door.

In various implementations, the object identifier of the object is further stored in association with a name of the object. In various implementations, generating the instruction is further based on the name of the object. For example, in response to a vocal command to "Turn on the stars," the plurality of instructions may be generated for a plurality of smart devices with "star" in the name of the device. For example, the smart agent can generate a first potential instruction to turn on the sixth device (e.g., the desk lamp 212) named "Star Light" and a second potential instruction to turn on a smart plug named "Ceiling Stars" attached to a string of LED lights suspended from the ceiling of a bedroom. Based on detecting the sixth device (e.g., the desk lamp 212) in an image of the physical environment at or proximate to the time the vocal command was issued, the smart agent selects the first potential instruction to turn on the desk lamp 212.

In various implementations, generating the instruction is further based on determining that a gaze of a user is directed at a location of the detection of the object. For example, in FIG. 2F, the smart agent can interpret the vocal command to "Turn on the light" as a first potential instruction to turn on the first device named "Bedroom Light", a second potential instruction to turn on the second device named "Kitchen Light", a third potential instruction to turn on the third device (e.g., the overhead lamp 213) named "Office Light", or a fourth potential instruction to turn on the sixth device (e.g., the desk lamp 212) named "Star Light". Based on detecting the desk lamp 212 and the overhead lamp 213 in the first XR environment 200 (e.g., in an image of the physical environment of the office on which the first XR environment 200 is based) at or proximate to the time the vocal command was issued, the smart agent narrows the plurality of potential instructions to the third potential instruction to turn on the overhead lamp 213 and the fourth potential instruction to turn on the desk lamp 212. Based on determining that the gaze of the user is directed at a location at which the desk lamp 212 was detected, the smart agent selects the fourth potential instruction as the instruction.

In various implementations, generating the instruction is further based on the state of the object. For example, in FIG. 2F, the smart agent can interpret the vocal command to "Turn on the light" as a first potential instruction to turn on the first device named "Bedroom Light", a second potential instruction to turn on the second device named "Kitchen Light", a third potential instruction to turn on the third device (e.g., the overhead lamp 213) named "Office Light", or a fourth potential instruction to turn on the sixth device (e.g., the desk lamp 212) named "Star Light". Based on detecting the desk lamp 212 and the overhead lamp 213 in the first XR environment 200 (e.g., in an image of the physical environment of the office on which the first XR environment 200 is based) at or proximate to the time the vocal command was issued, the smart agent narrows the plurality of potential instructions to the third potential instruction to turn on the overhead lamp 213 and the fourth potential instruction to turn on the desk lamp 212. Based on determining that the overhead lamp 213 is already on and the desk lamp 212 is off, the smart agent selects the fourth potential instruction as the instruction.

The method 500 continues, in block 550, with the device effectuating the instruction to change a state of the object. In various implementations, effectuating the instruction includes sending the instruction over a network to the object based on the object identifier (e.g., address) indicated in the instruction. For example, in FIG. 3A, the smart agent sends the data packet using an appropriate protocol, such as IP (e.g., HTTP) or Bluetooth, and the data packet is received by the addressed device, e.g., the desk lamp 212.

Because the method 500 includes detecting the object in an environment, the method 500 is robust to movement of the object to different environments. For example, in various implementations, the method 500 further includes receiving a second vocal command from the user. The method 500 further includes obtaining, using the image sensor, an image of a second physical environment and detecting, in the image of the second physical environment, the object. The method 500 further includes generating, based on the second vocal command and detection of the object, a second instruction including the object identifier of the object and effectuating the second instruction to change the state of the object.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:

at an electronic device including an image sensor, one or more processors, and non-transitory memory:

receiving a vocal command;

obtaining, using the image sensor, an image of a physical environment;

detecting, in the image of the physical environment, an object based on a visual model of the object stored in the non-transitory memory in association with an object identifier of the object;

determining, based on the vocal command, a plurality of potential instructions;

selecting, based on the detection of the object, one of the plurality of potential instructions as an intended instruction; and generating a data packet including the object identifier of the object to effectuate the intended instruction to change a state of the object.

2. The method of claim 1, wherein the object identifier of the object is further stored in association with an object type of the object and selecting the intended instruction is further based on the object type of the object.

3. The method of claim 1, wherein the object identifier of the object is further stored in association with a name of the object and selecting the intended instruction is further based on the name of the object.

4. The method of claim 1, wherein selecting the intended instruction is further based on determining that a gaze of a user is directed at a location of the detection of the object.

5. The method of claim 1, wherein selecting the intended instruction is further based on the state of the object.

6. The method of claim 1, further comprising:

receiving a second vocal command;

obtaining, using the image sensor, an image of a second physical environment;

detecting, in the image of the second physical environment, the object;

determining, based on the second vocal command, a second plurality of potential instructions;

selecting, based on the detection of the object, one of the second plurality of potential instructions as a second intended instruction; and generating a second data packet including the object identifier of the object to effectuate the second intended instruction to change the state of the object.

7. The method of claim 1, further comprising:

obtaining a request to enroll the object;

obtaining, using the image sensor, one or more images of the object;

determining, based on the one or more images of the object, the visual model of the object; and storing, in the non-transitory memory, the visual model of the object in association with the object identifier of the object.

8. A device comprising:

an image sensor;

a non-transitory memory; and one or more processors to:

receive a vocal command;

obtain, using the image sensor, an image of a physical environment;

detect, in the image of the physical environment, an object based on a visual model of the object stored in the non-transitory memory in association with an object identifier of the object;

determine, based on the vocal command, a plurality of potential instructions;

select, based on the detection of the object, one of the plurality of potential instructions as an intended instructions; and generate a data packet including the object identifier of the object to effectuate the intended instruction to change a state of the object.

9. The device of claim 8, wherein the object identifier of the object is further stored in association with an object type of the object and the one or more processors are to select the intended instruction based on the object type of the object.

10. The device of claim 8, wherein the object identifier of the object is further stored in association with a name of the object and the one or more processors are to select the intended instruction based on the name of the object.

11. The device of claim 8, wherein the one or more processors are to select the intended instruction further based on determining that a gaze of a user is directed at a location of the detection of the object.

12. The device of claim 8, wherein the one or more processors are to select the intended instruction based on the state of the object.

13. The device of claim 8, wherein the one or more processors are further to:

receive a second vocal command;

obtain, using the image sensor, an image of a second physical environment;

detect, in the image of the second physical environment, the object;

determine, based on the second vocal command, a second plurality of potential instructions;

select, based on the detection of the object, one of the second plurality of potential instructions as a second intended instructions; and generate a second data packet including the object identifier of the object to effectuate the second intended instruction to change the state of the object.

14. The device of claim 8, wherein the one or more processors are further to:

obtain a request to enroll the object;

obtain, using the image sensor, one or more images of the object;

determine, based on the one or more images of the object, the visual model of the object; and store, in the non-transitory memory, the visual model of the object in association with the object identifier of the object.

15. A non-transitory memory storing one or more programs, which, when executed by one or more processors of a device including an image sensor, cause the device to:

receive a vocal command;

obtain, using the image sensor, an image of a physical environment;

detect, in the image of the physical environment, an object based on a visual model of the object stored in the non-transitory memory in association with an object identifier of the object;

determine, based on the vocal command, a plurality of potential instructions;

select, based on the detection of the object, one of the plurality of potential instructions as an intended instructions; and generate a data packet including the object identifier of the object to effectuate the intended instruction to change a state of the object.

16. The non-transitory memory of claim 15, wherein the object identifier of the object is further stored in association with an object type of the object and the programs, when executed, cause the device to select the intended instruction based on the object type of the object.

17. The non-transitory memory of claim 15, wherein the object identifier of the object is further stored in association with a name of the object and the programs, when executed, cause the device to select the intended instruction based on the name of the object.

18. The non-transitory memory of claim 15, wherein the programs, when executed, cause the device to select the intended instruction based on determining that a gaze of a user is directed at a location of the detection of the object.

19. The non-transitory memory of claim 15, wherein the programs, when executed, cause the device to select the intended instruction based on the state of the object.

20. The non-transitory memory of claim 15, wherein the programs, when executed, further cause the device to:

receive a second vocal command;

obtain, using the image sensor, an image of a second physical environment;

detect, in the image of the second physical environment, the object;

determine, based on the second vocal command, a second plurality of potential instructions;

select, based on the detection of the object, one of the second plurality of potential instructions as a second intended instruction; and generate a second data packet including the object identifier of the object to effectuate the second intended instruction to change the state of the object.

21. The non-transitory memory of claim 15, wherein the programs, when executed, further cause the device to:

obtain a request to enroll the object;

obtain, using the image sensor, one or more images of the object;

determine, based on the one or more images of the object, the visual model of the object; and store, in the non-transitory memory, the visual model of the object in association with the object identifier of the object.

* * * * *